US012614101B2

(12) United States Patent
Fowler et al.

(10) Patent No.: US 12,614,101 B2
(45) **Date of Patent: \*Apr. 28, 2026**

(54) PREPROCESSING FOR CORRELATED TOPOLOGICAL QUANTUM ERROR CORRECTION

(71) Applicant: Google LLC, Mountain View, CA (US)

(72) Inventors: Austin Fowler, Los Angeles, CA (US); Alexandru Paler, Bavaria (DE)

(73) Assignee: GOOGLE LLC, Mountain View, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/669,113

(22) Filed: May 20, 2024

(65) Prior Publication Data

US 2026/0010816 A1     Jan. 8, 2026

Related U.S. Application Data

(63) Continuation of application No. 17/698,051, filed on Mar. 18, 2022, now Pat. No. 12,026,589.

(60) Provisional application No. 63/162,624, filed on Mar. 18, 2021.

(51) Int. Cl.
*G06N 10/70* (2022.01)

(52) U.S. Cl.
CPC .................................... *G06N 10/70* (2022.01)

(58) Field of Classification Search
CPC ...................................................... G06N 10/70
USPC .......................................................... 714/746
See application file for complete search history.

(56) References Cited

U.S. PATENT DOCUMENTS

| | | | | |
|---|---|---|---|---|
| 7,966,549 B2 * | 6/2011 | Hollenberg | ............ | B82Y 10/00 |
| | | | | 714/764 |
| 11,574,030 B1 * | 2/2023 | Harrigan | ................ | G06N 10/20 |
| 11,700,020 B2 * | 7/2023 | Delfosse | ............ | H03M 13/353 |
| | | | | 714/764 |
| 2022/0216884 A1 * | 7/2022 | Delfosse | ............ | H03M 13/1111 |
| 2022/0382632 A1 * | 12/2022 | Fowler | ................... | G06N 10/70 |

(Continued)

OTHER PUBLICATIONS

Andrist et al., "Optimal Error Correction in Topological Subsystem Codes", arXiv:1204.1838v2, May 14, 2012, 4 pages.

(Continued)

*Primary Examiner* — Albert Decady
*Assistant Examiner* — Osman M Alshack
(74) *Attorney, Agent, or Firm* — DORITY & MANNING P.A.

(57) ABSTRACT

A computer-implemented method for correcting one or more errors in a quantum computing system can include obtaining, by a computing system including one or more computing devices, a plurality of weighted detection graphs, each of the plurality of weighted detection graphs being descriptive of a plurality of error detection measurements and having a plurality of weights, each of the weights respectively determined according to an error probability. The method can include generating, by the computing system, a plurality of reweighted detection graphs based at least in part on a correlation between physical errors in the quantum computing system. The method can include correcting, by the computing system, one or more errors in a quantum computing system based at least in part on a global decoding of the plurality of reweighted detection graphs.

19 Claims, 9 Drawing Sheets

(56) References Cited

U.S. PATENT DOCUMENTS

| | | | | |
|---|---|---|---|---|
| 2023/0004849 A1* | 1/2023 | Jang | .................... | G06N 10/40 |
| 2023/0040234 A1* | 2/2023 | Aspuru-Guzik | ....... | G06N 10/70 |

OTHER PUBLICATIONS

Baireuther et al., "Neural Network Decoder for Topological Color Codes with Circuit Level Noise", arXiv:1804.02926v2, Oct. 18, 2018, 10 pages.

Bravyi et al., "Quantum Codes on a Lattice with Boundary", arXiv:quant-ph/9811052v1, Nov. 20, 1998, 6 pages.

Dennis et al., "Topological Quantum Memory", arXiv:quant-ph/0110143v1, Oct. 24, 2001, 39 pages.

Duclos-Cianci et al., "Fault-Tolerant Renormalization Group Decoder for Abelian Topological Codes", arXiv:1304.6100v1, Apr. 22, 2013, 11 pages.

Edmonds, "Maximum Matching and a Polyhedron With O,1-Vertices", Journal of Research of the National Bureau of Standards-B. Mathematics and Mathematical Physics vol. 69B, Nos. 1 and 2, Jan.-Jun. 1965, pp. 125-130.

Edmonds, "Paths, Trees and Flowers", Canadian Journal of Mathematics, Chapter 17, 1965, pp. 449-467.

Fowler et al., "Low Overhead Quantum Computation Using Lattice Surgery", arXiv:1808.06709v4, Aug. 30, 2019, 15 pages.

Fowler et al., "Surface Codes: Towards Practical Large-Scale Quantum Computation", arXiv:1208.0928, Oct. 27, 2012, 54 pages.

Fowler, "Optimal Complexity Correction of Correlated Errors in the Surface Code", arXiv:1310.0863v1, Oct. 2, 2013, 6 pages.

Gidney et al., "Flexible Layout of Surface Code Computations Using Autocoz States", arXiv:1905.08916v1, May 22, 2019, 17 pages.

Hutter et al., "An Efficient Markov Chain Monte Carlo Algorithm for the Surface Code", arXiv:1302.2669v2, Aug. 8, 2013, 10 pages.

Kivlichan et al., "Improved Fault-Tolerant Quantum Simulation of Condensed-Phase Correlated Electrons via Trotterization", arXiv:1902.10673v4, Jul. 13, 2020, 45 pages.

Litinski, "A Game of Surface Codes: Large-Scale Quantum Computing with Lattice Surgery", arXiv:1808.02892v3, Feb. 3, 2019, 37 pages.

Raussendorf et al., "Fault-Tolerant Quantum Computation with High Threshold in Two Dimensions", arXiv:quant-ph/0610082v2, May 14, 2007, 4 pages.

Raussendorf et al., "Topological Fault-Tolerance in Cluster State Quantum Computation", arXiv:quant-ph/0703143v1, Mar. 16, 2007, 20 pages.

Wootton, "A Simple Decoder for Topological Codes", arXiv:1310.2393v4, Apr. 9, 2015, 13 pages.

* cited by examiner

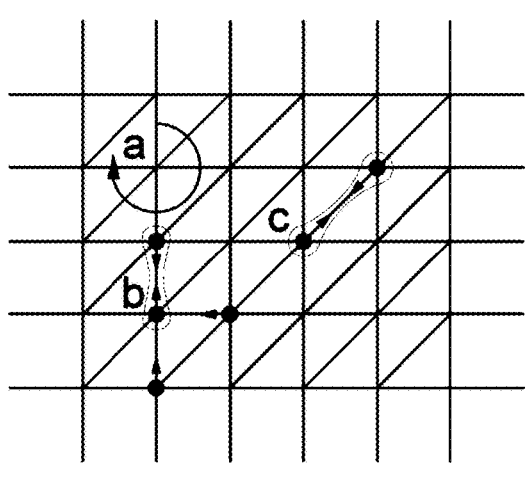
*FIG. 5A*
| | |
|---|---|
| │ | 4 |
| — | 6 |
| ∕ | 10 |
*FIG. 5B*
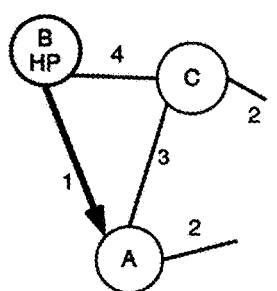
*FIG. 6A*
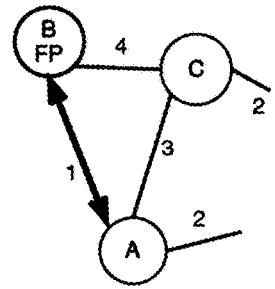
*FIG. 6B*
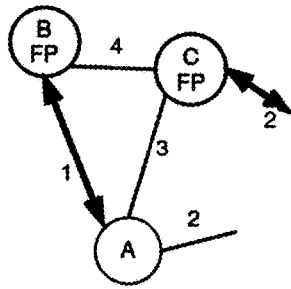
*FIG. 6C*
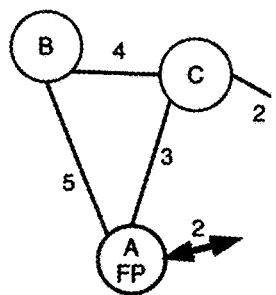
*FIG. 7A*
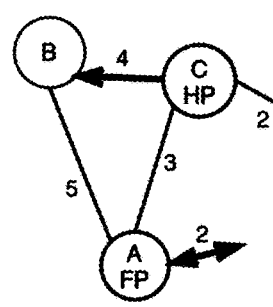
*FIG. 7B*
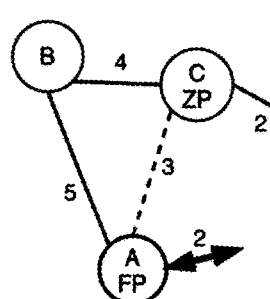
*FIG. 7C*

<u>800</u>

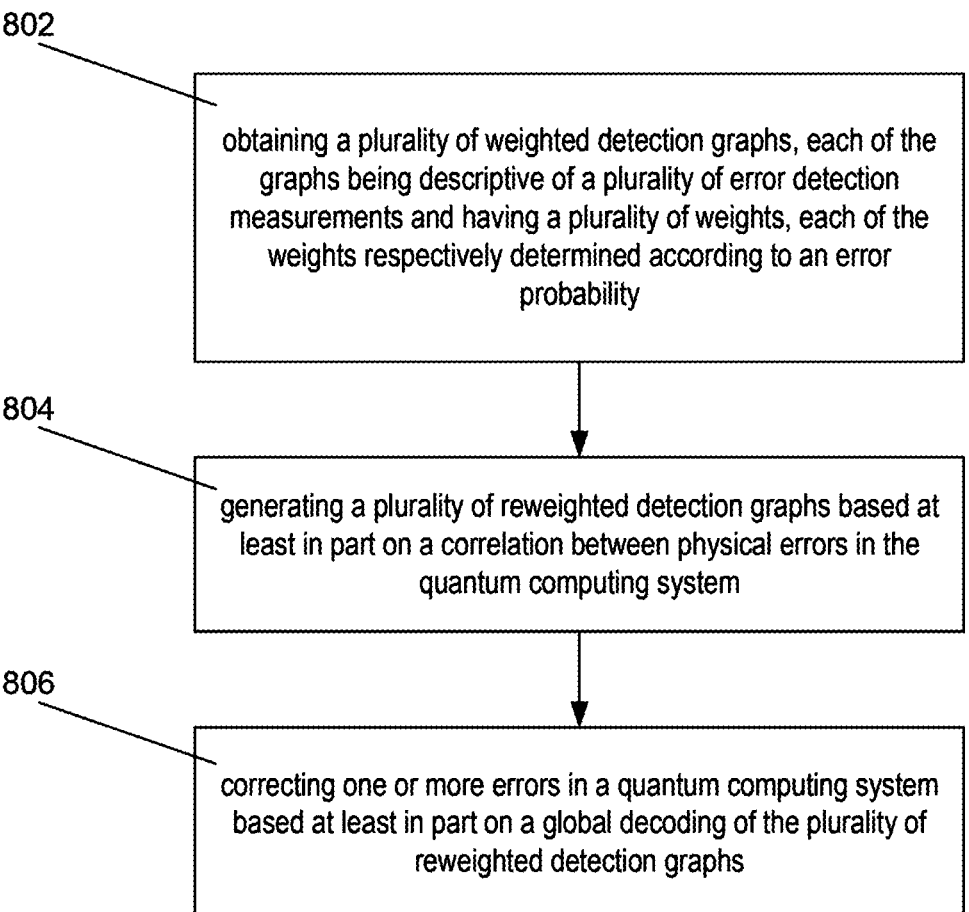

802 obtaining a plurality of weighted detection graphs, each of the graphs being descriptive of a plurality of error detection measurements and having a plurality of weights, each of the weights respectively determined according to an error probability

804 generating a plurality of reweighted detection graphs based at least in part on a correlation between physical errors in the quantum computing system

806 correcting one or more errors in a quantum computing system based at least in part on a global decoding of the plurality of reweighted detection graphs

*FIG. 8*

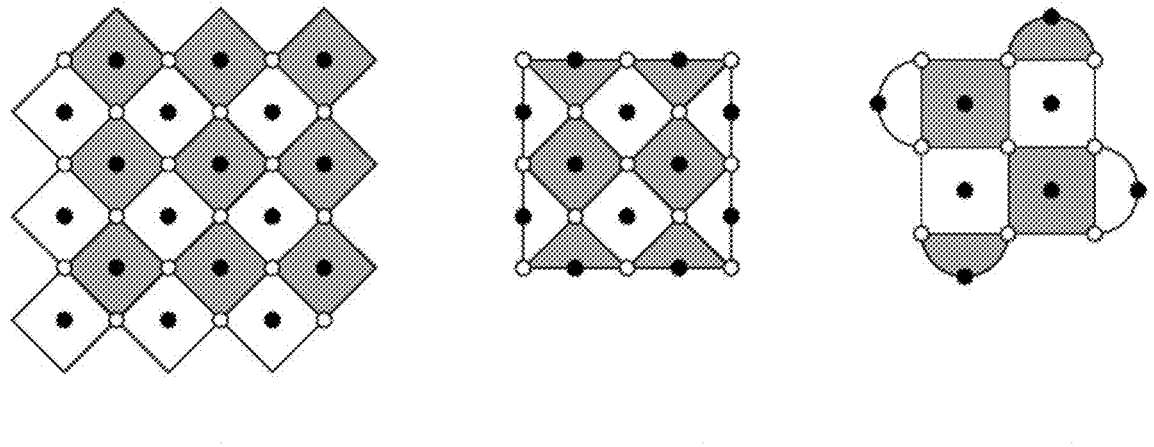
FIG. 10                    FIG. 11                    FIG. 12

Correlated: ----
Uncorrelated: ----

PREPROCESSING FOR CORRELATED TOPOLOGICAL QUANTUM ERROR CORRECTION

PRIORITY

The present application is a continuation of U.S. patent application Ser. No. 17/698,051 (filed Mar. 18, 2022; issued as U.S. Pat. No. 12,026,589 Jul. 2, 2024), which is hereby incorporated by reference herein in its entirety. U.S. patent application Ser. No. 17/698,051 claims the benefit of and priority to U.S. Provisional Patent Application No. 63/162,624 (filed Mar. 18, 2021), which is hereby incorporated by reference herein in its entirety.

FIELD

The present disclosure relates generally to algorithms for quantum error correction for quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as $a|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for correcting one or more errors in a quantum computing system. The method can include obtaining, by a computing system comprising one or more computing devices, a plurality of weighted detection graphs. Each of the plurality of weighted detection graphs may, for example, be descriptive of a plurality of error detection measurements and have a plurality of weights, each of the weights respectively determined according to an error probability. The method can include generating, by the computing system, a plurality of reweighted detection graphs based at least in part on a correlation between physical errors in the quantum computing system. The method can include correcting, by the computing system, one or more errors in the quantum computing system based at least in part on a global decoding of the plurality of reweighted detection graphs.

In some implementations, the plurality of reweighted detection graphs can be generated in parallel. In some implementations, generating, by the computing system, the plurality of reweighted detection graphs can include, for each of the plurality of weighted detection graphs, reweighting, by the computing system, at least one weight of the plurality of weights, the at least one weight corresponding to a correlated edge correlated to a local prematching of the plurality of error detection measurements.

Another example aspect of the present disclosure is directed to a quantum computing system. The quantum computing system can include quantum hardware including a plurality of qubits. The quantum computing system can include one or more classical processors. The one or more classical processors can be configured to perform operations including obtaining a plurality of weighted detection graphs respectively corresponding to a plurality of qubit subsets of the plurality of qubits. Each of the graphs can be descriptive of a plurality of error detection measurements associated with the respective qubit subset. The weighted detection graphs can each have a plurality of weights, and each of the weights can be respectively determined according to a probability of error determined for the respective qubit subset. The one or more classical processors can be configured to perform operations including prematching one or more error detection measurements locally within a graph of the plurality of weighted detection graphs. The one or more classical processors can be configured to perform operations including reweighting the graph based at least in part on one or more errors locally correlated to the one or more matched error detection measurements. The one or more classical processors can be configured to perform operations including correcting one or more errors in a quantum computing system based at least in part on a global decoding of the plurality of reweighted detection graphs.

Another example aspect of the present disclosure is directed to a processor configured to perform operations. The operations can include receiving a detection graph based at least in part on a physical configuration a subset of qubits of a quantum computing system. The subset of qubits can represent at least one data qubit and include one or more ancilla qubits configured to generate a plurality of error detection measurements to correspond to errors of the data qubit. The detection graph can include a plurality of vertices intersected by a plurality of edges, and the plurality of vertices can include a plurality of detection nodes corresponding to the plurality of error detection measurements. The operations can include selecting a locally prematched pair of adjacent vertices of the detection graph linked by a first edge of the plurality of edges. The prematched pair of adjacent vertices can include a first detection node. The operations can include reweighting a second edge of the plurality of edges based at least in part on a correlation between the first edge and the second edge. The operations can include outputting data descriptive of a reweighted detection graph.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which:

FIG. 5A depicts a diagram of an example prematching procedure performed on a slice of a detection graph for an example embodiment of a quantum computing system according to example aspects of the present disclosure;

FIG. 5B depicts a legend for the diagram in FIG. 5A.

FIG. 6A depicts a detection graph undergoing one embodiment of a prematching procedure according to example aspects of the present disclosure;

FIG. 6B depicts a detection graph undergoing one embodiment of a prematching procedure according to example aspects of the present disclosure;

FIG. 6C depicts a detection graph undergoing one embodiment of a prematching procedure according to example aspects of the present disclosure;

FIG. 7A depicts a detection graph undergoing one embodiment of a prematching procedure according to example aspects of the present disclosure;

FIG. 7B depicts a detection graph undergoing one embodiment of a prematching procedure according to example aspects of the present disclosure;

FIG. 7C depicts a detection graph undergoing one embodiment of a prematching procedure according to example aspects of the present disclosure;

FIG. 8 depicts a flow chart of an example method for reweighting a detection graph according to example aspects of the present disclosure;

FIG. 10 depicts an example diagram of a distance-three toric surface code used in simulations performed on one example embodiment according to example aspects of the present disclosure;

FIG. 11 depicts an example diagram of a distance-three unrotated surface code used in simulations performed on one example embodiment according to example aspects of the present disclosure;

FIG. 12 depicts an example diagram of a distance-three rotated surface code used in simulations performed on one example embodiment according to example aspects of the present disclosure;

DETAILED DESCRIPTION

Figure 1:
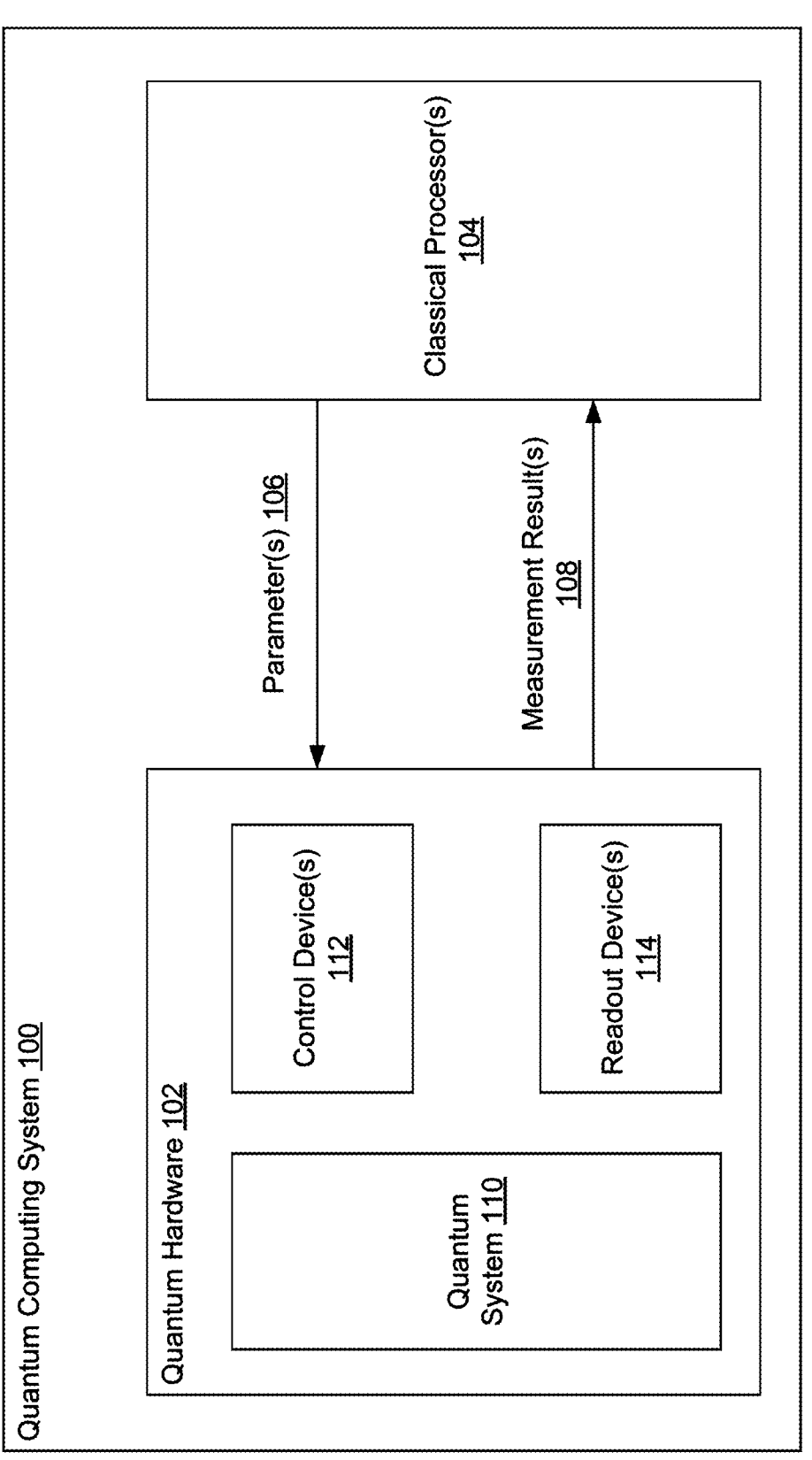
FIG. 1 depicts an example embodiment of a quantum computing system according to example aspects of the present disclosure.

Example aspects of the present disclosure are directed to systems, devices, and computer-implemented methods for error detection in quantum computing systems. More particularly, example aspects are directed to reweighting a detection graph based at least in part on correlations in an underlying error model for a quantum error correction process. For example, a quantum error correction process may include reducing the error rate of logical qubits of a quantum computing system by detecting and correcting physical errors within the system. Uncorrected physical errors can generate errors in the logical qubit, but the quantum computing system may be configured to permit identification and correction of the physical errors. Advantageously, embodiments according to example aspects of the present disclosure leverage correlations between physical errors to identify likely physical errors with improved computational efficiency.

For instance, in some embodiments, each logical qubit may be encoded in a plurality of physical qubits. For instance, a code (e.g., a topological code, such as a surface code) may encode a logical qubit using data qubits and ancilla qubits. The ancilla qubits may be configured such that their respective states can be measured to detect physical errors (e.g., errors of the physical qubits and/or of their measurement). These error detection measurements may be combined to build a weighted detection graph, with the weights of the graph links corresponding to an associated error probability. Embodiments according to example aspects of the present disclosure provide for the efficient reweighting of the detection graph based on correlations between physical errors, advantageously lowering the computational cost of achieving a desired logical error rate.

Prior techniques for leveraging error correlations have often proved to be computationally expensive. For example, some prior techniques required processing all error detection measurements to determine a first set of results, adjusting the probabilities of certain error detection measurements according to known correlations among the first set of results, and then re-processing all error detection measurements with the adjusted probabilities. For real-time tracking of quantum errors, intervals between subsequent error detection measurements are generally on the scale of microseconds, and the iterative global processing of the entire set of error detection measurements can result in substantial computational overhead.

Advantageously, systems and methods according to example aspects of the present disclosure enable real-time parallelized processing of correlated errors. For example, systems and methods according to example aspects of the present disclosure can offer improved performance for scalable deployment in real-world, noisy quantum computing systems with increasing numbers of qubits.

For example, in some embodiments, a quantum computing system can comprise a number of qubits subdivided into qubit subsets. Each of the qubit subsets can include data qubits and ancilla qubits to collectively encode one or more logical qubits. Error detection measurements corresponding to each qubit subset can be stored in a local detection graph associated with that qubit subset. The local detection graph can be representative of detection events recorded in one or more rounds of error detection measurements. Based at least in part on the physical configuration of the respective qubit subset, different patterns of detection events (e.g., spatial patterns and/or temporal patterns) can correspond to different physical errors.

The pattern(s) of detection events in the local detection graph may, in some examples, indicate one or more physical errors which may be correlated to one or more other physical errors. To efficiently leverage the known correlations between errors, example embodiments according to aspects of the present disclosure provide for local preprocessing of the local detection graphs (e.g., before global decoding is applied to all the detection graphs collectively). For instance, local preprocessing can be applied to each local detection graph according to correlations between local detection events. Local preprocessing can include, for example, recognizing likely patterns within the detection graph and editing the detection graph to indicate an increased probability of one or more patterns correlated to the recognized likely patterns. In this manner, as one example, a subsequent global decoder can receive detection graphs indicative of correlated errors. Thus, any subsequent global decoding can directly leverage error correlations. For instance, correlations can be leveraged by a global decoder without requiring multiple decoding iterations.

In some embodiments, recognizing likely patterns within the detection graph can include locally matching (e.g., prematching) a pair of adjacent vertices of the graph, in which non-boundary vertices correspond to detection events. In some embodiments, a local prematching can include determining a pair of vertices of the detection graph that respectively prefer each other among the neighbors surrounding each. For instance, "preference" can be determined in some embodiments according to probabilities associated with the edges intersecting the vertices. The probability associated with an edge, in one example, may be determined based at least in part on the probabilities of physical errors that would trigger the detection events represented by the detection nodes on the edge. In some embodiments, a preferred pairing may be determined by processing a first node to find its tentative preferred pairing, and subsequently processing that tentative preferred pairing to determine if it reciprocates (e.g., if it prefers the first node). A pair of vertices that respectively prefer each other can be considered "fully-prematched."

In some embodiments, if the tentative preferred pairing is a boundary vertex, then the first node may be considered "fully-prematched" to the boundary. In some embodiments, a detection node is only locally prematched to the boundary if no other detection node in the neighborhood of that node is already locally prematched to the boundary.

Advantageously, locally prematched vertex pairs can, in some embodiments, provide insight regarding any physical errors present within the corresponding physical qubits and/or logical qubits. For example, in one embodiment, one vertex may be determined to "prefer" another if the error that likely triggered the one vertex is also likely to have triggered the other. For instance, in this example, the error may be considered to have generated the shared edge—the edge connecting the vertices.

For example, each detection event may be recorded and stored on the detection graph as a detection node. In some cases, a physical error triggers one, two, or more detection events, and based at least in part on a physical configuration of the physical qubits in the quantum computing system, it may be determined the detection events may correspond to a pattern including adjacent detection nodes. For instance, an error triggering one detection event may correspond, in some examples, to a detection node adjacent to a boundary vertex. In another example, an error triggering two detection events may correspond to two adjacent detection nodes. In another example, an error triggering more than two detection events may correspond to at least two adjacent detection nodes. Accordingly, leveraging knowledge of the patterns of detection nodes triggered by different physical errors, prematching of adjacent vertices can be used to help identify one or more physical errors that likely generated the pattern of detection nodes in the detection graph.

Depending on the arrangement of the qubits in the qubit subset, in some embodiments, errors generative of the shared edge (e.g., triggering detection events associated with at least one of the endpoints of the shared edge) may be correlated to errors that generate one or more other edges. Accordingly, in some embodiments, the shared edge may be correlated with one or more other edges of the detection graph. Similarly, in some embodiments, errors generative of the shared edge may also generate one or more other edges. Edge correlations can optionally be determined prior to runtime. For example, one or more edges of the detection graph may be stored with predetermined correlations. In some embodiments, a basis can be formed of one or more single-edge subgraphs of the detection graph, and edge correlations can be associated with each basis edge. For instance, the edge basis can optionally be used to decompose patterns of measured detection events, with a list of the decomposed edges being associated with the respective basis edges. In some embodiments, the detection graph can be assembled, in part, by associating an edge from the edge basis with a location within the detection graph (e.g., a particular error detection measurement gate).

According to determined correlations between edges of the graph, for example, a correlation probability can be determined for edges nearby the shared edge (e.g., edges in the neighborhood of at least one of the prematched pair, etc.). Thus, the detection graph can be edited to incorporate the correlation probabilities, by, for example, reweighting (e.g., decreasing the weight of) nearby edges to reflect the correlation probabilities of the nearby edges. The reweighted detection graph can optionally be locally preprocessed again and/or be passed on to a decoder (e.g., the global decoder). In this manner, for example, the local detection graph can be locally preprocessed to leverage information regarding correlated errors to improve the accuracy of subsequent global decoding processes.

In some embodiments, a local detection graph may be locally preprocessed in a pipelined and/or streaming processing configuration. For instance, the local detection graph can be processed in substantially real-time. In one embodiment, detection nodes in the local detection graph may be locally prematched in a temporal order. In some embodiments, local prematching may be performed on detection nodes in order of increasing detection event measurement time t. Advantageously, embodiments according to example aspects of the present disclosure can provide for local preprocessing that only updates the prematching states of detection nodes at present and future locations in the processing queue. For example, some embodiments include local preprocessing that does not update the state of previously-processed detection nodes. For instance, outputs of one or more local preprocessors may be streamed in substantially real-time to a global decoder for global decoding of a global detection graph. As the local detection graphs are built with each round of error detection measurements, locally preprocessed data may be streamed to a global decoder without requiring changes to past-time detection nodes at the local or global level. However, it is to be understood that some embodiments may include one or more updates to past-time states, if desired.

One example implementation of a local preprocessor may receive a chronological ordering of detection nodes, which may each be initialized with a prematching state of "zero-prematched." As discussed below, the prematching state can be updated to "half-prematched" and "fully-prematched" according to various example embodiments. In some embodiments, changes in state (e.g., to and/or from "zero-prematched," "half-prematched," and "fully-prematched," etc.) are applied at the current time (e.g., time of the first node) and/or toward future time (e.g., time of subsequent node(s) in a chronological ordering). In some embodiments, changes in state are not applied retroactively (e.g., to any prior node(s) in a chronological ordering). For instance, in some embodiments, detection nodes can be locally prematched in a pipelined manner—e.g., without updating the state(s) of previously-processed (e.g., earlier) detection nodes.

For instance, in one embodiment, a zero-prematched detection node may be preprocessed by looking among its neighborhood of adjacent vertices for a most likely pairing, and if one or more pairings are equally likely, a race condition can be used to select among the pairings. If the most likely pairing is found to be a past-time detection node, the present-time, zero-prematched detection node may remain zero-prematched—e.g., no update is made to either node—and the preprocessor may proceed to the next detection node for preprocessing. However, if the pairing is found to be a future-time detection node (e.g., that is also zero-prematched), the state of that future-time detection node may be updated to be half-prematched to the present-time, zero-prematched detection node. In some embodiments, the future-time detection node may be half-prematched to another detection node, and the state of that future-time detection node may be updated to store a reference to the present-time, zero-prematched detection node. In some embodiments, however, if the state of the future-time detection node is already half-prematched (e.g., to a node other than the present-time, zero-prematched node), the future-time detection node may be reset to zero-prematched.

In one embodiment, a half-prematched detection node may be preprocessed by looking among its neighborhood of adjacent vertices for a most likely pairing. (The half-prematched state of the node may be associated with a stored reference to a past-time node which preferred the half-prematched detection node.) If a pairing having the highest probability includes a past-time node to which the half-prematched detection node is half-prematched, then the state of the half-prematched detection node may be updated to be fully-prematched with the same past-time node. If a pairing having the highest probability includes a different detection node than a past-time node to which it is half-prematched, in some embodiments, the state of that different detection node may be updated with a half-prematched reference to the half-prematched detection node. However, in some embodiments, if that different detection node is already half-prematched, then the state of that different detection node may optionally be reset to zero-prematched. Additionally, in some embodiments, the state of the half-prematched detection node may also be reset to zero-prematched, because none of the as-yet processed nodes form a mutually preferred pairing with it.

Advantageously, in example embodiments according to aspects of the present disclosure, local preprocessing of the detection graphs can be performed in parallel. In some embodiments, local preprocessing can include no-communication preprocessing. For instance, local preprocessing can be applied in a pipelined configuration. In some embodiments, each qubit subset can be configured to stream locally preprocessed error detection measurements and/or detection graph data to a global decoder (e.g., for real-time global decoding of correlated errors). In some embodiments, local preprocessing can optionally be implemented in a hardware-encoded processor. For instance, local preprocessing can be performed by an application-specific integrated circuit (ASIC) and/or field-programmable gate array (FPGA).

In some embodiments, a global decoder can comprise a general matching process (e.g., minimum-weight perfect matching). In some examples, a decoder can be implemented by an error detection and/or error correction system for identifying errors in quantum computations. For example, in some cases, error detection measurements may be performed to record data descriptive of detection events in real time, such as in time slices and/or continuously. For instance, each time slice may correspond to a set of quantum gate operations at each of a plurality of qubits. The detection event data may be received with microsecond-level precision (e.g., half a microsecond) in some cases. In one example embodiment, a decoder can provide for globally matching one or more pairs detection events (e.g., according to a matching process, such as minimum weight perfect matching). The path can be indicative of a most likely source of error which would trigger the matched endpoints. In some cases, such errors can propagate through a quantum computation, and so prompt detection and/or correction can be beneficial.

Example aspects of the present disclosure are described herein with respect to quantum computing applications and error detection for the purposes of illustration. Example aspects of the present disclosure can be beneficial for detecting and evaluating errors in quantum computing systems. In addition, the general problem of weighted matching in graphs can be useful in other applications, including many engineering disciplines. In some cases, example aspects of the present disclosure can be applied to such other applications in accordance with the present disclosure.

Systems and methods according to example aspects of the present disclosure can provide for a number of technical effects and benefits, including but not limited to improvements to computing technology (e.g., quantum computing technology). For instance, example aspects of the present disclosure can provide for reduced evaluation time of error information and/or evaluating error information in a scalable manner. This is especially beneficial in real-world (e.g., noisy) quantum computing applications, which present a need for rapid, real-time error correction on an increasing number of qubits.

With reference now to the FIGS., example embodiments of the present disclosure will be discussed in further detail.

FIG. 1 depicts an example quantum computing system 100. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

Figure 2A:
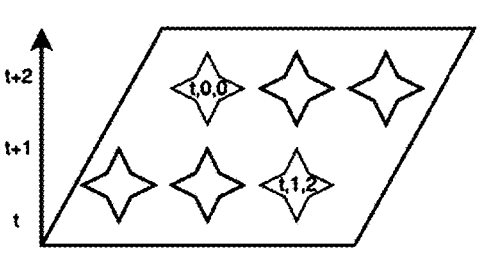
FIG. 2A depicts a time-layer visualization of a set of error detection measurements for an example embodiment of a quantum computing system according to example aspects of the present disclosure.

In some embodiments, a subset of qubits may be configured with ancilla qubits configured in a planar arrangement, as shown in FIG. 2A, where the star graphics each indicate a ancilla qubit site. Each ancilla qubit can correspond to a set of coordinates, which may include time and location information. For instance, the depiction in FIG. 2A illustrates two detection events measured at a time t for two qubits.

Figure 2B:
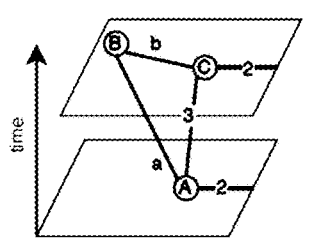
FIG. 2B depicts a visualization of a set of error detection measurements with multiple time layers for an example embodiment of a quantum computing system according to example aspects of the present disclosure.
Figure 2C:
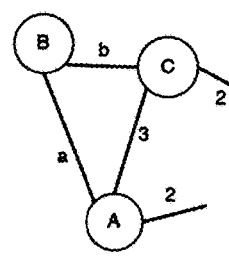
FIG. 2C depicts a detection graph for an example embodiment of a quantum computing system according to example aspects of the present disclosure.

The planar slice of error detection measurements at time t shown in FIG. 2A can be combined with error detection measurements from past times to build a detection graph, as shown in FIG. 2B. For instance, the error detection measurements (t, 0, 0) and (t, 1, 2) from FIG. 2A respectively correspond to detection nodes B and C from FIG. 2B, and detection node A corresponds to a detection event measurement from a past time, e.g., t−1. Both A and C are adjacent to a boundary, and thus share an edge with the boundary. As each of A, B, and C are in the neighborhood of each other, each is connected to the others by a weighted edge. Each edge in the graph is given a weight, for example, either numerically or symbolically (e.g., a and b are used in FIG. 2B as variables storing the weight of their corresponding edges). FIG. 2C depicts the graph of FIG. 2B without any time layer visualization.

Figure 3A:
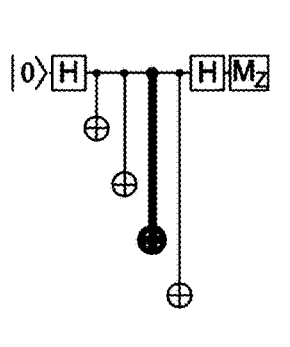
FIG. 3A depicts a two-dimensional quantum circuit diagram of a set of error detection measurement gates for an example embodiment of a quantum computing system according to example aspects of the present disclosure.
Figure 3B:
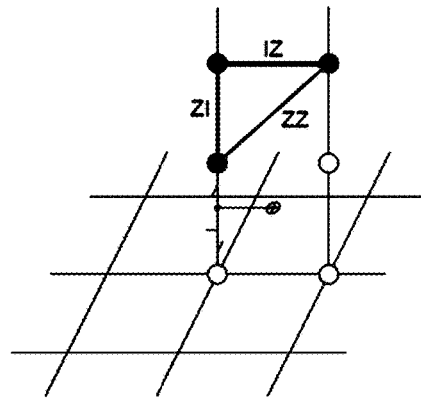
FIG. 3B depicts a portion of a detection graph built from three rounds of error detection measurements of an unrotated surface code for an example embodiment of a quantum computing system according to example aspects of the present disclosure.
Figure 3C:
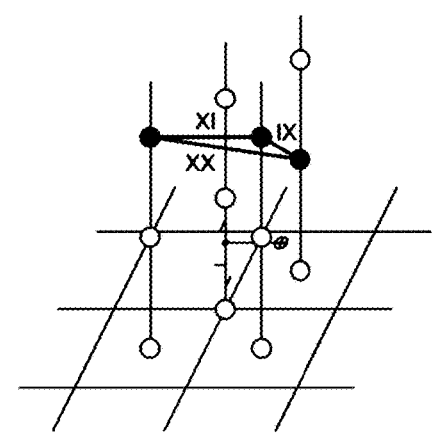
FIG. 3C depicts a portion of a detection graph built from three rounds of error detection measurements of an unrotated surface code for an example embodiment of a quantum computing system according to example aspects of the present disclosure.
Figure 4A:
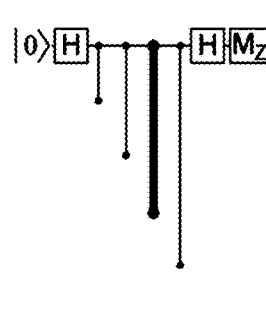
FIG. 4A depicts a two-dimensional quantum circuit diagram of a set of error detection measurement gates for an example embodiment of a quantum computing system according to example aspects of the present disclosure.
Figure 4B:
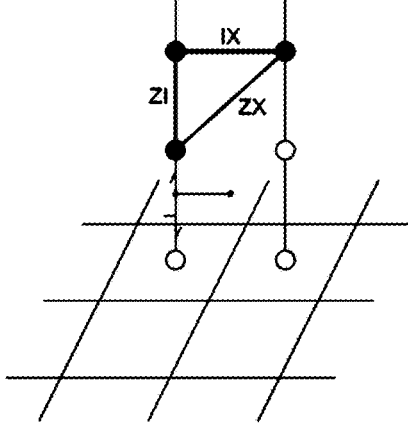
FIG. 4B depicts a portion of a detection graph built from three rounds of error detection measurements of an unrotated surface code for an example embodiment of a quantum computing system according to example aspects of the present disclosure.
Figure 4C:
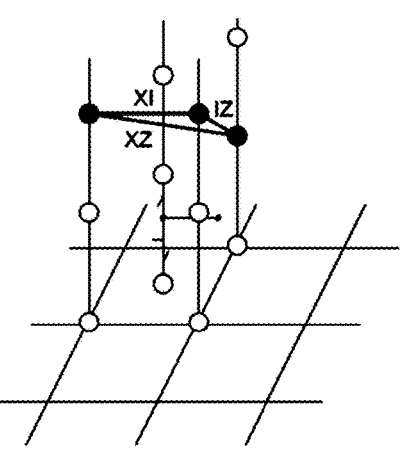
FIG. 4C depicts a portion of a detection graph built from three rounds of error detection measurements of an unrotated surface code for an example embodiment of a quantum computing system according to example aspects of the present disclosure.

To illustrate how an analysis of correlations in the surface code may be performed in various embodiments, the two sets of figures in FIGS. 3A-3C and 4A-4C each give an example of a single two-qubit gate undergoing multiple rounds of error detection measurements. For instance, the depicted example gate may provide for the measurement of a stabilizer in a surface code. FIGS. 3A and 4A depict the subject gates in bold. The detection nodes (dark circles) aligned on the vertices of the base grid are indicative of detection events measured on X stabilizers, and the detection nodes aligned on the faces of the base grid are indicative of detection events measured on Z stabilizers. In the depicted example, depolarizing noise is assumed, with each of the 15 nontrivial tensor products of I, X, Y, and Z potentially having a different probability. Time runs horizontally in FIGS. 3A and 4A and vertically in FIGS. 3B-3C and 4B-4C. In the depicted examples, each error on the bolded gate can lead to anything from 0 to 4 detection events, but only those errors leading to pairs of detection nodes are shown, connected by a bold edge labeled with the generative error. Such an edge may keep a list of errors that generated it—each generating error may be appended to the error list of the appropriate edge.

In some embodiments, for each gate a list of errors may be kept, and each error may be associated with a list of coordinates of detection nodes. Those errors that lead to single detection events may be represented graphically by an edge to an unspecified boundary. The coordinate of the generating detection event may then uniquely identify each boundary edge. In various embodiments, a single gate may generate no or many boundary edges. Each boundary edge may keep a list of errors that generated it, and each error on this gate that generates a boundary edge may be appended to the appropriate error list.

Errors that are products of those shown in FIGS. 3B-3C and 4B-4C can lead to 4 detection events—e.g., in some embodiments, the range of patterns can be decomposed to the basis of those errors shown. Such errors with more than two detection events may be added to the error lists associated with each decomposed edge, and each copy of these errors may be specially annotated with the list of decomposed lines for later processing.

In some embodiments, when every gate in the potential computation has been analyzed in this manner, the resultant master graph may be configured to contain a set of potential detection nodes and connecting edges. As discussed above, each edge may contain a list of errors, with each error labeled with its generating gate, and some errors may contain a list of decomposed edges.

The connecting edges may be associated with a probability based at least in part on the edges connecting the detection nodes. In some embodiments, the edge probability can be the sum of the probability of each error associated with the edge. In some embodiments, the edge probability may be the probability that an odd number of independent errors in the corresponding list of errors $e_i$ occur. In some embodiments, the edge probability $p_e$ may be the probability of exactly one independent error occurring, as may be calculated according to Eq. 1.

$$p_e = \sum_i p_i \prod_{j \neq i} (1 - p_j) \qquad (1)$$

As noted above, in some embodiments, some of the errors associated with each edge may have a list of decomposed edges. The decomposed edges that are different from the parent may be considered "correlated edges." Each unique correlated edge may be associated with a subset of the errors associated with the parent edge. The probability of each correlated edge may be calculated using Eq. 1 with appropriately reduced $p_i$ values. The relative probability of each correlated edge may then be obtained by dividing by the edge probability $p_e$.

The master graph, as described in the above example embodiment, includes many edges located in space-time, each weighted according to a probability, with some edges being associated with a probability of being correlated with other nearby edges. In some embodiments, the weight of edges may be expressed as $w_e = -\ln p_e$.

In one embodiment, a master graph may be constructed for a set of qubits (e.g., a surface code for encoding a logical qubit) in the manner described above. In some embodiments, the master graph may be constructed prior to runtime. At runtime, the surface code may undergo one or more rounds of error detection measurements.

Detection events observed by these measurement rounds can be recorded in a detection graph built on the framework matching that of the master graph. For example, the detection graph can comprise a plurality of vertices intersected by a plurality of edges, and the error detection measurements can be stored as detection nodes on vertices of the detection graph. The boundary of the detection graph can be associated with boundary vertices. In some embodiments, the physical configuration of the qubit subset influences the construction of the detection graph. For instance, the spatial arrangement of stabilizers in the qubit subset can correspond to one or more coordinates of the vertices of the graph. The coordinates of the vertices can also include a time value. For instance, a detection graph can include one or more layers respectively corresponding to one or more subsequent rounds of error detection measurement. In some embodiments, the qubit subset can be represented by a two-dimensional array, with a third graph dimension representing states in time.

As detection events are recorded in the detection graph, a prematching process according to example aspects of the present disclosure may be used to identify likely edges within the detection graph. For instance, "identifying" a likely edge may include, in some embodiments, determining an edge from the master graph (e.g., a basis edge from FIGS. 3B-3C, FIGS. 4B-4C) that corresponds to an edge within the measured detection graph. Once an edge within the measured detection graph can be identified, the correlations associated with that edge—based on the underlying error model, as discussed above, for example—may be used to adjust the probabilities of those correlated edges. For instance, adjusting the probabilities of those correlated edges may help improve the accuracy of the detection, and ultimately, the correction of those correlated errors.

According to one example embodiment, likely edges may be chosen as follows:

for each detection node no, find the set of neighboring detection nodes $n_i$ with the most likely (e.g., highest probability and/or lowest weight) connecting edges (if the set contains more than one, any canonical ordering of the edges may be used to prioritize selection, such as with a race condition); and for each detection node no with a chosen neighboring detection node $n_1$, determine if $n_0$ is the chosen detection node of $n_1$—if so, then associate the two.

The above process may be illustrated as shown in FIGS. 5A-5B. FIG. 5A depicts a detection graph having six detection nodes, and FIG. 5B depicts the weights assigned to the edges in the basis used to construct the graph. Portion "a" of FIG. 5A indicates the selected ordering for processing of edges emanating from any subject vertex (clockwise, starting from the top). Portion "b" illustrates the association of two detection nodes. The central detection node has three neighbors: one to the top, one to the right, and one to the bottom. The first edge in the chosen ordering having the lowest weight (a weight of 4) points to the top node. The top node only has one neighbor, the central node. Therefore, each of the central node and top node respectively prefer each other, and are associated with each other as a likely pairing. Portion "c" similarly depicts two detection nodes forming a mutually chosen pair.

In some embodiments, the prematching of likely pairings may then be used for reweighting the detection graph. For instance, predetermined correlations (e.g., as discussed above) may be used to associate additional correlated probabilities $p_c$ with nearby edges. (If more than one correlated probability is associated with a single edge, a race condition may be used, for example.) The reweighted edge probability $p_f$, in some embodiments, may be written as $p_f = p_e + p_c$. This in turn may become a new weight for the edge, with $w_e = -\ln p_f$. An optional second round of prematching may be performed, with the matchings kept this time and passed on to a general matching algorithm or other decoder (e.g., a global decoder).

Another example of prematching in another embodiment according to example aspects of the present disclosure is provided in FIGS. 6A-6C. The detection graph containing the detection nodes A, B, and C may be generated, for example, as discussed with respect to FIGS. 2A-2C, with a=1 and b=4. For instance, using the coordinates from FIGS. 2A-2C, the detection graph of FIGS. 6A-6C may be processed in the following order: (1) increasing time, (2) increasing i-coordinate, and (3) increasing j-coordinate. However, it is to be understood that another ordering may be selected as desired.

As illustrated in FIGS. 6A-6C, the equivalence relation ↔ may be used to indicate a fully-prematched condition, and a half-prematched condition may be indicated with → or ←, with the direction of the arrow indicating the target of the half-prematch.

In some embodiments, a strict prematching condition can be formulated as A←B if B is the only neighbor of A in the detection graph. For instance, the strict condition may, in some embodiments, guarantee that the prematched nodes are also valid matchings from the perspective of a minimum weight perfect matching. In some embodiments, a relaxed prematching condition may be used. For instance, a relaxed condition may be used to provide for more matchings in a higher-error environment (e.g., a noisy set of qubits triggering more detection events).

Initially (not shown), all detection events may be set as zero-prematched ("ZP"). Half-prematching may be performed towards the future. Based on the ordering set out above for the example shown in FIGS. 6A-6C, A is processed first. As shown in FIG. 6A, the lowest edge extending from A points to B, and B is later in the queue, so B is half-prematched ("HP") to A (i.e., A←B). After prematching B, the lowest weight edge points to A, and the state of B is updated to fully-prematched ("FP"), as shown in FIG. 6B. The lowest edge weight of C is the one connecting to the boundary, and C is automatically FP, as shown in FIG. 6C. However, if C←B (not shown), and C is the same as the stored reference to A, then the state of B may be transformed from HP to FP.

Another example of prematching in another embodiment according to example aspects of the present disclosure is provided in FIGS. 7A-7C. The detection graph containing the detection nodes A, B, and C may be generated, for example, as discussed with respect to FIGS. 2A-2C, with a=5 and b=4. For instance, using the coordinates from FIGS. 2A-2C, the detection graph of FIGS. 7A-7C may be processed in the following order: (1) increasing time, (2) increasing i-coordinate, and (3) increasing j-coordinate. However, it is to be understood that another ordering may be selected as desired.

The example depicted in FIGS. 7A-7C illustrates a prematching with the boundary. In some embodiments, it may be desired to avoid matching with the boundary. For example, matching with the boundary may be applied, in some embodiments, whenever a detection node adjacent to the boundary is processed and no other detection node in its neighborhood has the state FP or HP. For instance, matching with the boundary may be applied to a detection node adjacent to the boundary when no other detection node in its neighborhood is fully-prematched to the boundary.

For instance, as shown in FIG. 7A, when A is processed, the lowest weight edge is connecting to the boundary, and A is automatically set to FP. When prematching B, the lowest weight edge is towards C, which is then set to HP with a stored reference to B, as shown in FIG. 7B. Because A is FP and in the neighborhood of C, the lowest weight edge for C is not considered, and the next best option for C is pointing towards A. However, because A is already FP, C cannot be prematched (in this embodiment), and its state is reset to ZP, as shown in FIG. 7C.

In some embodiments, updating the states of the detection nodes can include checking the validity of the states of the node and its surrounding adjacent nodes. For example, in some embodiments, before processing a detection node, the node generally may be in the ZP state (as initialized) or HP (if it has been previously prematched). In some embodiments, an unprocessed node in the FP state may indicate a prematching error. In another example, in some embodiments, after processing a detection node, the node generally may be in the FP state (if prematched) or the ZP state (if no prematch found). In embodiments which avoid updating past-time detection nodes, a past-time node may not be finalized as FP or ZP, and the HP state of a past-time node may indicate an error.

In some embodiments, the prematching raises an error E each time it discovers that it was implemented in an inconsistent or incorrect manner, improving parallelization by offering rules for enforcing and checking data consistency when multiple processes are updating in parallel. For example, an example set of state update rules can be expressed as shown in Tables 1 and 2. The tables reflect valid state transitions when processing a detection node M that prefers an detection node N. In this example, there are two possibilities: either N has a coordinate lower than M within the ordering selected for processing the detection nodes (e.g., N is a past-time node), or N has a coordinate higher than M (e.g., N is a future-time node).

TABLE 1

Example set of detection node state update transition rules if, within the ordering of the detection nodes, coord(N) < coord(M) (when not indicated by a subscript, the state of the latest (bold) detection event is updated).

|  | N | | |
| --- | --- | --- | --- |
| M | ZP | HP | FP |
| ZP | ZP | E | ZP |
| HP | FP/ZP | E | E/ZP |
| FP | E | E | E |

US 12,614,101 B2

15

TABLE 2

Example set of detection node state update transition rules if, within the ordering of the detection nodes, coord(N) > coord(M) (when not indicated by a subscript, the state of the latest (bold) detection event is updated).

| N | M | | |
|---|---|---|---|
| | ZP | HP | FP |
| ZP | HP | $ZP_M$ | E |
| HP | E/ZP | $E/ZP_{M,N}$ | E |
| FP | E | E | E |

As shown in Table 1, where coord (N)<coord (M), if N has state HP, then it is generally an error, because N should have been already processed. If the state of M is FP, this is impossible and always an error (in this example embodiment), because M is only now being processed. This leaves four non-error transitions (in one example embodiment):

1. If M is ZP and N is ZP, then the state of M is not changed, because N is in the past.
2. If M is HP and N is ZP, and if the backwards reference from M points to N, then both prematch directions are fulfilled, and M is fully prematched to N.
3. If M is HP and N is ZP, and if the reference from M does not point to N, then the state of M is reset to ZP.
4. If M is HP and N is FP, the state of A is reset to ZP (if the reference from M points to N, it is an obvious error).

As shown in Table 2, where coord (N)>coord (M), it is generally an error if M is FP, as M is only now being processed. Similarly, it is generally an error for N to be FP (in this example embodiment), because it is in the future and has not been processed by now. This leaves four non-error transitions (in one example embodiment):

1. If both M and N are ZP, then the state of N is changed to HP and N will store a reference to M.
2. If M is HP and the future N is still ZP, it means that the backwards prematch condition for M is not fulfilled and the state of M is reset to ZP.
3. If N is HP and its reference points to M, it is generally an error, because M is only now being processed and has not caused a change in the state of N to HP (see, e.g., FIGS. 6A-6C). Otherwise, if N is HP and M is ZP, then the state of M is kept ZP and the state of N is reset to ZP (this is an optional "strict" rule—the state of N may optionally be kept HP).
4. If N is HP and M is HP, the states of both M and N are reset to ZP.

FIG. 8 depicts a flow chart illustrating one example embodiment according to aspects of the present disclosure, an example method 800. At 802, the method 800 includes obtaining a plurality of weighted detection graphs, each of the graphs being descriptive of a plurality of error detection measurements and having a plurality of weights, each of the weights respectively determined according to an error probability. For instance, one or more of the weighted detection graphs may be structured as discussed herein with respect to FIGS. 2A-2C.

At 804, the method 800 includes generating a plurality of reweighted detection graphs based at least in part on a correlation between physical errors in the quantum computing system. In some embodiments, the plurality of reweighted detection graphs may be generated in parallel.

At 806, the method 800 includes correcting one or more errors in a quantum computing system based at least in part on a global decoding of the plurality of reweighted detection graphs.

In some embodiments, at 804, one or more of the plurality of reweighted detection graphs may be generated by, for each of the detection graphs, reweighting at least one weight of the plurality of weights, the at least one weight corresponding to a correlated edge. For example, the correlated edge may be correlated to a local prematching of the plurality of error detection measurements. For instance, the correlations may be determined, in one embodiment, according to an underlying error model, as discussed above with respect to the examples in FIGS. 3A-3C and 4A-4C.

For example, in one embodiment, reweighting the at least one weight comprises selecting a locally prematched pair of adjacent vertices of the detection graph. The locally pre-matched pair of adjacent vertices may, for instance, be linked by a first edge of the plurality of edges. In one embodiment, at least one vertex of the locally prematched pair of vertices corresponds to a detection node (e.g., a first detection node). In one embodiment, both vertices of the locally prematched pair of vertices each respectively correspond to a detection node. Reweighting the at least one weight may also comprise reweighting the correlated edge of the plurality of edges based at least in part on a correlation between the first edge and the correlated edge. In some embodiments, the first edge corresponds to a most likely edge, having, for instance, a minimum weight of the weights of a subset of the plurality of edges containing all edges both (a) linking any two adjacent detection nodes and (b) intersecting at least one of the pair of adjacent vertices. For example, in one embodiment, the first edge corresponds to the lowest weight of the weights of a set containing one or more edges respectively connecting each vertex of the locally prematched pair of vertices to one or more neighboring vertices.

In some embodiments, selecting the prematched pair of adjacent vertices comprises processing a first candidate vertex and processing a second candidate vertex. For example, the first candidate vertex may be considered, in some embodiments, as a potential prematch for the first detection node, and the second candidate vertex may be considered as a potential prematch for the first candidate vertex. If the second candidate vertex (e.g., a potential prematch for the first candidate vertex) is determined to be the first detection node, then the first detection node and the first candidate vertex may be determined to respectively prefer each other.

For example, in one embodiment, the method includes determining a first candidate vertex connected to the first detection node by a first candidate edge. The first candidate edge may correspond to the lowest weight of the weights of a first candidate set of one or more edges respectively connecting the first detection node to one or more neighboring vertices. In some embodiments, the method includes determining a second candidate vertex connected to the first candidate vertex by a second candidate edge. The second candidate edge may correspond to the lowest weight of the weights of a second candidate set of one or more edges respectively connecting the first candidate vertex to one or more neighboring vertices. In some embodiments, the method includes prematching the first candidate vertex and the second candidate vertex. For instance, in some embodiments, the second candidate vertex corresponds to the first detection node.

In one embodiment, the prematched pair of adjacent vertices comprises a boundary vertex. In one embodiment, no other detection node in the neighborhood of the first detection node is prematched to a boundary vertex.

In one embodiment, the error detection measurement corresponding to the first candidate vertex occurred after the error detection measurement corresponding to the first detection node.

Figure 9:
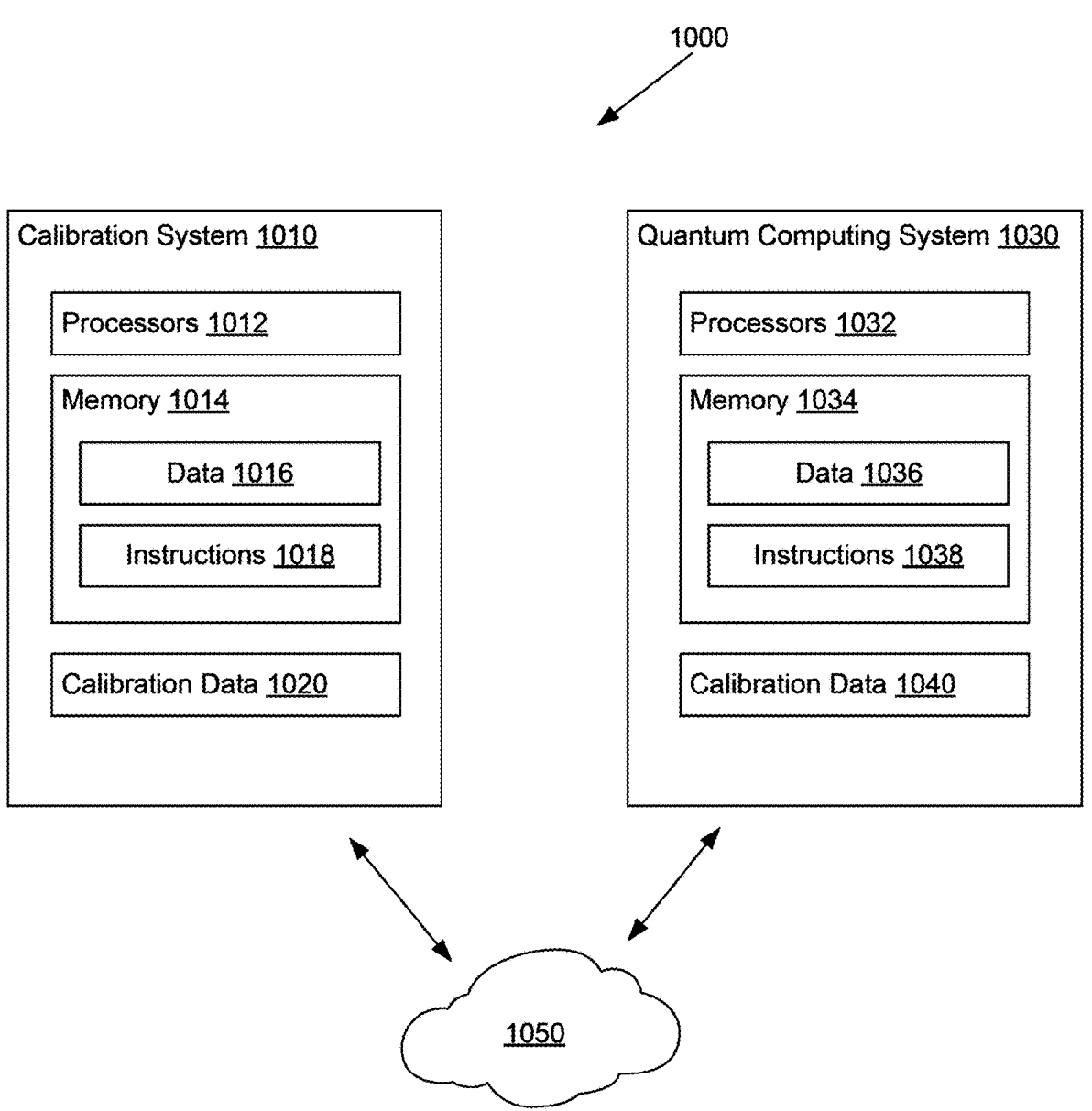
FIG. 9 depicts an example computing system according to example embodiments of the present disclosure.

FIG. 9 depicts a block diagram of an example computing system 1000 that can be used to implement the systems and methods according to example embodiments of the present disclosure, such as the system discussed with reference to FIG. 1. The system 1000 includes a control system 1010 and a quantum computing system 1030 that are communicatively coupled over a network 1050. One or more aspects of any of the methods described herein can be implemented on the control system 1010 and/or the quantum computing system 1030.

The control system 1010 can include any type of computing device (e.g., classical computing device). The control system 1010 includes one or more processors 1012 and a memory 1014. The one or more processors 1012 can include any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage mediums, such as RAM, ROM, EEPROM, EPROM, flash memory devices, magnetic disks, etc., and combinations thereof. The memory 1014 can store data 1016 (e.g., qubit parameters, measurements, etc.) and instructions 1018 which are executed by the processor 1012 to cause the control system 1010 to perform operations, such as one or more aspects of any of the method disclosed herein. The control system 1010 can be configured to process error information 1020 obtained by measuring outputs of a quantum system (e.g., quantum system 1040) to identify errors in quantum computations according to example embodiments of the present disclosure.

The quantum computing system 1030 includes one or more processors 1032 and a memory 1034. The one or more processors 1032 can include suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage mediums, such as RAM, ROM, EEPROM, EPROM, flash memory devices, magnetic disks, etc., and combinations thereof. The memory 1034 can store data 1036 and instructions 1038 which are executed by the processor 1032 to cause the quantum computing system 1030 to perform operations, such as implementation of a quantum circuit having one or more quantum gates on a quantum system 1040 having a plurality of qubits and obtaining associated measurements (e.g., error information 1020). The quantum computing system 1030 can be similar to the quantum computing system discussed and described with reference to FIG. 1. Other suitable quantum computing systems can be used without deviating from the scope of the present disclosure.

The network 1050 can be any type of communications network, such as a local area network (e.g., intranet), wide area network (e.g., Internet), or some combination thereof and can include any number of wired or wireless links. In general, communication over the network 1050 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some implementations, the network 1050 may be omitted such that the control system 1010 is in direct signal communication with quantum computing system 1030.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs (e.g., one or more modules of digital and/or quantum computer program instructions encoded on a tangible non-transitory storage medium for execution by, or to control the operation of, data processing apparatus). The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit (i.e., a system that defines the unit of quantum information). It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Example Simulation Results

The results of three simulations are provided as an example illustration of the performance of one embodiment of a quantum error correction system including a local prematching according to aspects of the present disclosure. The three example cases include the toric, unrotated, and rotated surface codes depicted in FIGS. 10-12, respectively, each with and without correlated graph reweighting. As depicted in FIGS. 10-12, the dark plaquettes represent X stabilizers, and the light plaquettes represent Z stabilizers. In all 3 cases shown, the logical X operator of interest runs from top to bottom.

Standard equal gate duration 8-step CNOT-based circuits were used (e.g., as shown in FIG. 3A), with all gates suffering standard depolarizing noise of equal probability p. Explicitly, initialization and measurement prepare and measure the wrong states with probability p, single-qubit gates including the identity suffer X, Y, Z errors each with probability p=3, and CNOT gates suffer all 15 non-trivial tensor products of I, X, Y, Z each with probability p=15. The logical X failure rate per round is measured by simulating a sufficiently large number of rounds N such that the final probability of logical error is around 10%, equating this with the probability of obtaining an odd number of logical errors in N, and backing out the failure rate per round using a sum of binomial terms.

Figure 13:
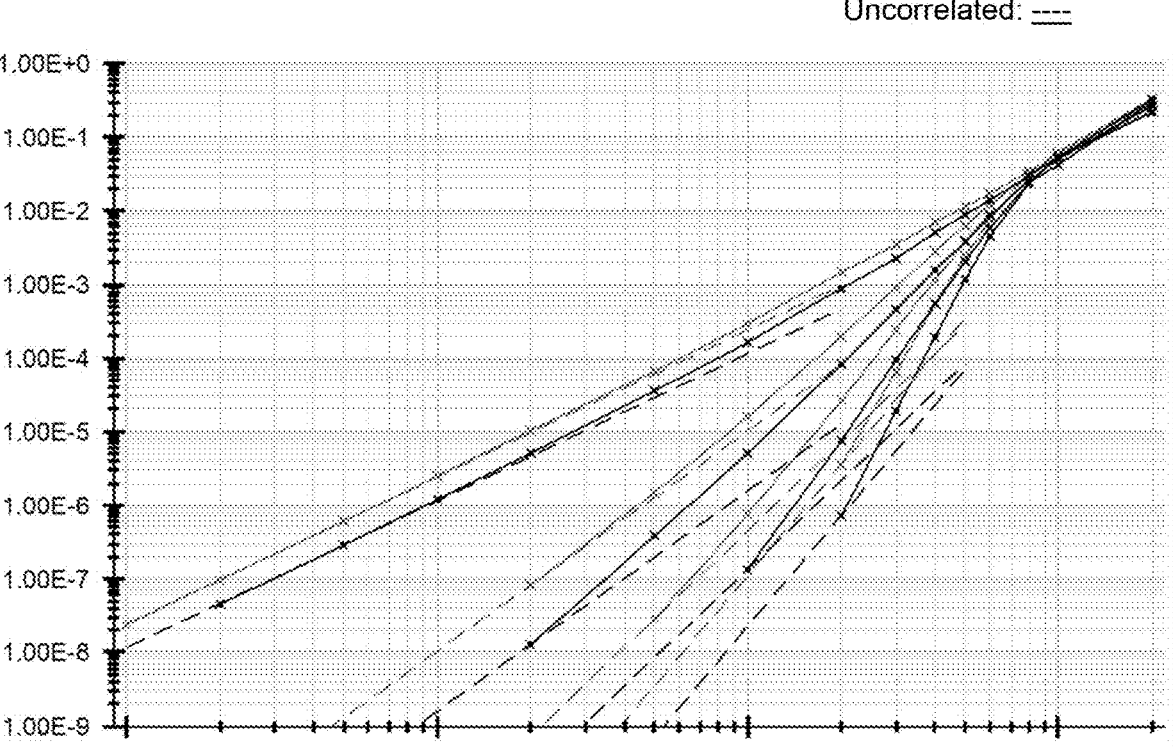
FIG. 13 depicts results from the simulation applied to example distance-three, distance-five, distance-seven, and distance-nine toric surface code embodiments according to example aspects of the present disclosure.
Figure 14:
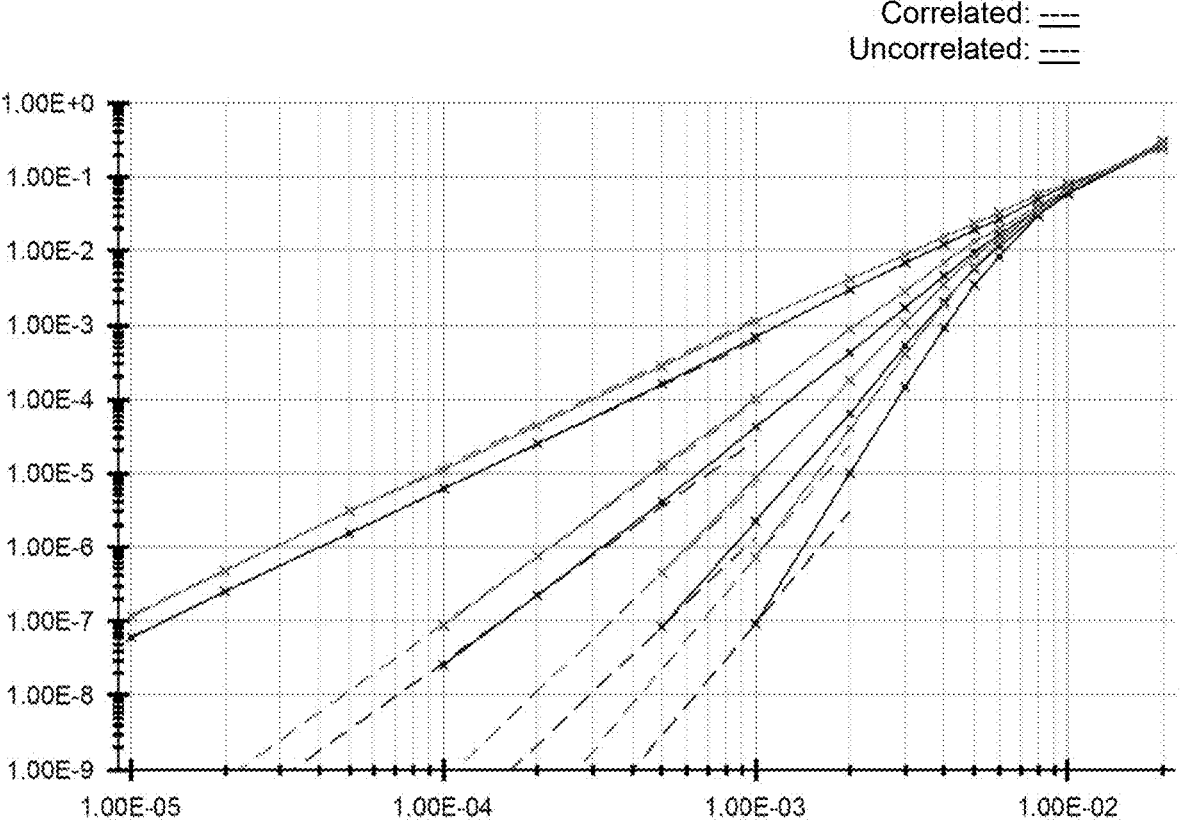
FIG. 14 depicts results from the simulation applied to example distance-three, distance-five, distance-seven, and distance-nine unrotated surface code embodiments according to example aspects of the present disclosure.
Figure 15:
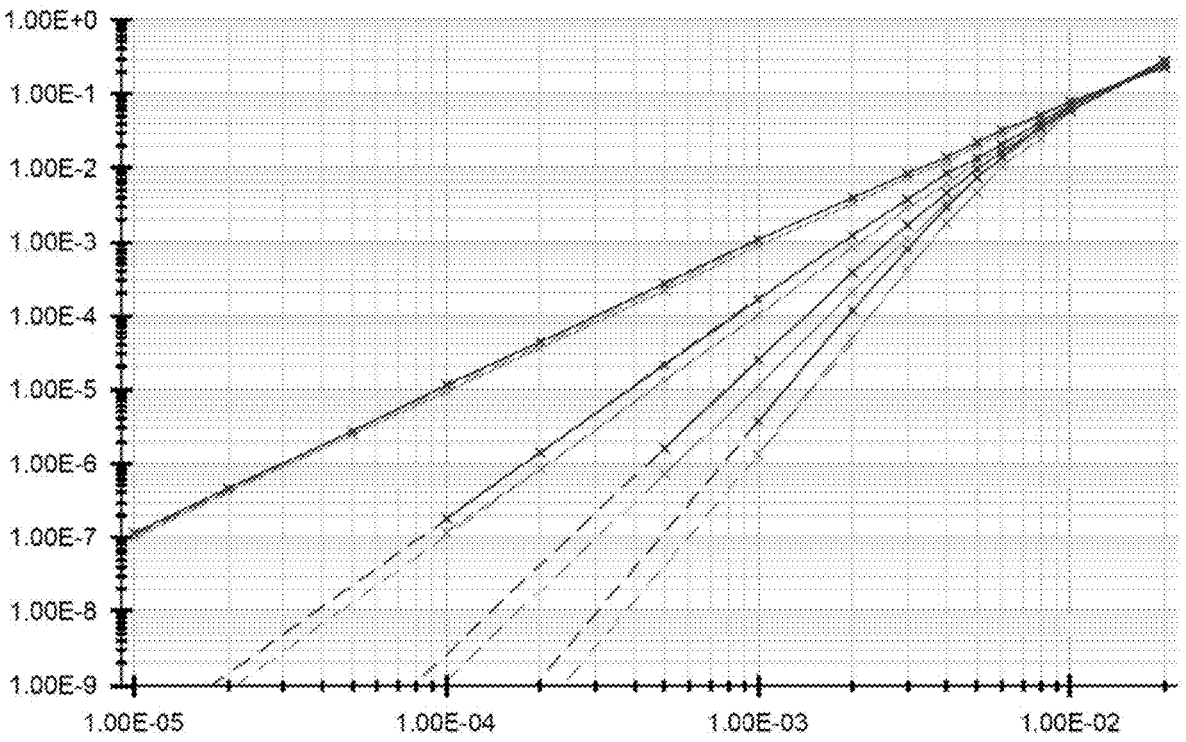
FIG. 15 depicts results from the simulation applied to example distance-three, distance-five, distance-seven, and distance-nine rotated surface code embodiments according to example aspects of the present disclosure.

Simulation results are shown in FIGS. 13-15 for the toric, unrotated, and rotated surface codes, respectively. The dashed lines show the $p^2$, $p^3$, $p^4$, and $p^5$ lines, respectively— the asymptotic slope of each line. The data curves are much steeper than the asymptotic curves for high distances and high gate error rates, showing that logical errors are suppressed at even higher powers than these in this regime.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for correcting one or more errors in a quantum computing system, the method comprising:

obtaining, by a computing system comprising one or more computing devices, a plurality of error detection measurements;

storing, by the computing system, the plurality of error detection measurements in a processing queue that is configured to store a detection graph with chronological ordering of error detection measurements based on a detection time;

wherein the detection graph is based at least in part on a physical configuration of a respectively corresponding subset of qubits of the quantum computing system, the subset of qubits representing at least one data qubit and comprising one or more ancilla qubits configured to generate the plurality of error detection measurements;

prematching, by the computing system, a respective detection measurement;

streaming, by the computing system, data describing the prematched respective detection measurement to an error decoder for decoding errors in the subset of qubits of the quantum computing system; and correcting, by the computing system, one or more errors in the quantum computing system based on the data describing the prematched respective detection measurement.

2. The computer-implemented method of claim 1, wherein prematching the respective detection measurement comprises:

storing, by the computing system, a respective prematching state of the respective detection measurement with respect to a paired respective detection measurement.

3. The computer-implemented method of claim 2, wherein prematching the respective detection measurement comprises:

prematching, by the computing system, the plurality of error detection measurements in the chronological ordering.

4. The computer-implemented method of claim 3, wherein prematching the plurality of error detection measurements in the chronological ordering comprises:

updating, by the computing system, respective prematching states only for paired detection measurements corresponding to contemporaneous and future times with respect to a respective measurement time of the respective detection measurement.

5. The computer-implemented method of claim 2, wherein prematching the respective detection measurement comprises:

computing, by the computing system, a likely pairing of the respective detection measurement with respect to the paired respective detection measurement, wherein the paired respective detection measurement corresponds to a future measurement time with respect to a respective measurement time of the respective detection measurement;

updating, by the computing system, a prematching state of the paired respective detection measurement; and storing, by the computing system and in association with the paired respective detection measurement, a reference to the respective detection measurement.

6. The computer-implemented method of claim 2, wherein prematching the respective detection measurement comprises:

computing, by the computing system, a likely pairing of the respective detection measurement with respect to the paired respective detection measurement, wherein the paired respective detection measurement corresponds to a past measurement time with respect to a respective measurement time of the respective detection measurement;

updating, by the computing system, a prematching state of the respective detection measurement; and storing, by the computing system and in association with the respective detection measurement, a reference to the paired respective detection measurement.

7. The computer-implemented method of claim 2, comprising:

computing, by the computing system, a likely pairing of the respective detection measurement with respect to the paired respective detection measurement;

wherein computing the likely pairing is based on one or more weights of one or more edges connecting the respective detection measurement to the paired respective detection measurement on the detection graph.

8. The computer-implemented method of claim 7, wherein the one or more weights correspond to a sum of the probabilities of one or more errors associated with the one or more edges.

9. The computer-implemented method of claim 7, comprising:

reweighting, by the computing system and using the data describing the prematched respective detection measurement, the detection graph.

10. The computer-implemented method of claim 2, wherein the data describing the prematched respective detection measurement comprises the respective prematching state.

11. The computer-implemented method of claim 1, wherein the detection graph is a local detection graph of a plurality of local detection graphs that collectively describe a global set of error detections for globally decoding errors in at least a portion of the quantum computing system, and wherein the method comprises:

generating, by the computing system in parallel, locally prematched detection measurement data for the plurality of local detection graphs.

12. The computer-implemented method of claim 1, wherein the plurality of error detection measurements are respectively associated with one or more quantum gates, and wherein the method comprises:

storing, by the computing system, a respective list of errors for each respective quantum gate; and mapping, by the computing system, each error of the list of errors to a generating gate of the one or more quantum gates.

13. An error correction system for correcting one or more errors in a quantum computing system, the error correction system comprising:

one or more classical processors; and one or more non-transitory, computer-readable media storing instructions that are executable by the one or more classical processors to cause the error correction system to perform operations, the operations comprising:

obtaining a plurality of error detection measurements;

storing the plurality of error detection measurements in a processing queue that is configured to store a detection graph with chronological ordering of error detection measurements based on a detection time;

wherein the detection graph is based at least in part on a physical configuration of a respectively corresponding subset of qubits of the quantum computing system, the subset of qubits representing at least one data qubit and comprising one or more ancilla qubits configured to generate the plurality of error detection measurements;

prematching a respective detection measurement;

streaming data describing the prematched respective detection measurement to an error decoder for decoding errors in the subset of qubits of the quantum computing system;

correcting one or more errors in the quantum computing system based on the data describing the prematched respective detection measurement.

14. The error correction system of claim 13, wherein prematching the respective detection measurement comprises:

storing a respective prematching state of the respective detection measurement with respect to a paired respective detection measurement.

15. The error correction system of claim 14, wherein prematching the respective detection measurement comprises:

computing a likely pairing of the respective detection measurement with respect to the paired respective detection measurement, wherein the paired respective detection measurement corresponds to a future measurement time with respect to a respective measurement time of the respective detection measurement;

updating a prematching state of the paired respective detection measurement; and storing, in association with the paired respective detection measurement, a reference to the respective detection measurement.

16. The error correction system of claim 14, wherein prematching the respective detection measurement comprises:

computing a likely pairing of the respective detection measurement with respect to the paired respective detection measurement, wherein the paired respective detection measurement corresponds to a past measurement time with respect to a respective measurement time of the respective detection measurement;

updating a prematching state of the respective detection measurement; and storing, in association with the respective detection measurement, a reference to the paired respective detection measurement.

17. The error correction system of claim 13, wherein prematching the plurality of error detection measurements in the chronological ordering comprises:

updating respective prematching states only for paired detection measurements corresponding to contemporaneous and future times with respect to a respective measurement time of the respective detection measurement.

18. The error correction system of claim 13, wherein the detection graph is a local detection graph of a plurality of local detection graphs that collectively describe a global set of error detections for globally decoding errors in at least a portion of the quantum computing system, and wherein the operations comprise:

streaming, to the error decoder in parallel, locally prematched detection measurement data for the plurality of local detection graphs.

19. A quantum computing system, comprising:

quantum hardware comprising a plurality of qubits; and one or more classical processors;

wherein the one or more classical processors are configured to perform operations, the operations comprising:

obtaining a plurality of error detection measurements;

storing the plurality of error detection measurements in a processing queue that is configured to store a detection graph with chronological ordering of error detection measurements based on a detection time; wherein the detection graph is based at least in part on a physical configuration of a respectively corresponding subset of qubits of the quantum computing system, the subset of qubits representing at least one data qubit and comprising one or more ancilla qubits configured to generate the plurality of error detection measurements;

prematching a respective detection measurement;

streaming data describing the prematched respective detection measurement to an error decoder for decoding errors in the subset of qubits of the quantum computing system; and correcting one or more errors in the quantum hardware based on the data describing the prematched respective detection measurement.

\* \* \* \* \*